United States Patent
Oyaide

(10) Patent No.: US 7,589,623 B2
(45) Date of Patent: Sep. 15, 2009

(54) SIGNAL APPARATUS FOR A VEHICLE

(75) Inventor: Andrew Oghenovo Oyaide, Birmingham (GB)

(73) Assignee: TRW Limited (GB)

( * ) Notice: Subject to any disclaimer, the term of this patent is extended or adjusted under 35 U.S.C. 154(b) by 256 days.

(21) Appl. No.: 11/252,226

(22) Filed: Oct. 17, 2005

(65) Prior Publication Data
US 2006/0092005 A1 May 4, 2006

Related U.S. Application Data

(63) Continuation of application No. PCT/GB2004/001598, filed on Apr. 13, 2004.

(30) Foreign Application Priority Data

Apr. 17, 2003 (GB) ................................. 0308912.5

(51) Int. Cl.
*B60Q 1/40* (2006.01)

(52) U.S. Cl. ....................... 340/476; 340/438; 340/468

(58) Field of Classification Search .................. 340/475
See application file for complete search history.

(56) References Cited

U.S. PATENT DOCUMENTS

| | | | | |
|---|---|---|---|---|
| 3,806,868 A | * | 4/1974 | Portman | 340/457 |
| 4,907,844 A | * | 3/1990 | White | 340/457 |
| 5,414,407 A | * | 5/1995 | Gerrans et al. | 340/475 |
| 5,646,590 A | * | 7/1997 | Dembicks | 340/475 |
| 6,034,600 A | * | 3/2000 | Browne et al. | 340/475 |
| 6,483,430 B2 | * | 11/2002 | Okuda et al. | 340/476 |
| 6,498,507 B1 | | 12/2002 | Meany et al. | |
| 6,876,300 B2 | * | 4/2005 | Ponziani | 340/476 |
| 2003/0004643 A1 | | 1/2003 | Serezat | 701/301 |

FOREIGN PATENT DOCUMENTS

| | | |
|---|---|---|
| DE | 199 62 945 | 4/2001 |
| EP | 0 927 677 | 7/1999 |
| JP | 09039650 | 2/1887 |
| JP | 57155131 | 9/1982 |
| JP | 62055236 | 3/1987 |
| JP | 62055236 A | 3/1987 |
| JP | 02231241 | 9/1990 |
| JP | 09039650 A | 2/1997 |
| JP | 11342808 A | 12/1999 |

* cited by examiner

*Primary Examiner*—George A Bugg
(74) *Attorney, Agent, or Firm*—MacMillan, Sobanski & Todd, LLC

(57) ABSTRACT

A signal apparatus for a vehicle having at least one input at which signals are received from components associated with the vehicle. The received signals comprise an indication demand signal initiated by a driver of the vehicle and a lane detection signal produced by a lane detection apparatus indicative of the position of the vehicle relative to a lane of a highway. A processing means is arranged to produce an indication signal that is dependent upon both the indication demand signal and the lane detection signal.

16 Claims, 3 Drawing Sheets

SIGNAL APPARATUS FOR A VEHICLE

CROSS-REFERENCE TO RELATED APPLICATIONS

This application is a continuation of International Application No. PCT/GB2004/001598 filed Apr. 13, 2004, the disclosures of which are incorporated herein by reference, and which claimed priority to Great Britain Patent Application No. 0308912.5 filed Apr. 17, 2003, the disclosures of which are incorporated herein by reference.

BACKGROUND OF THE INVENTION

This invention relates to improvements in signal apparatus for a vehicle, especially but not exclusively for signalling the intent of a driver during a lane change manoeuvre on a highway.

A lane change on a highway having multiple lanes such as a motorway or dual carriageway requires the use of an indicator by the driver during the lane change. The indicator, usually a lamp that can produce a flashing amber light visible at the side of the vehicle in which the driver wants to turn, warns other drivers that the vehicle is changing lane. After a lane change manoeuvre is complete the driver must cancel the indicator, as a self-cancelling mechanism will not operate during such a manoeuvre in many situations. Often drivers forget to cancel the indicator, which can prove annoying to other drivers.

Some attempts have been made to overcome this problem using a timer to cancel the indicator after a predetermined time or number of flashes of the indicator. This does not provide a satisfactory solution, as the driver may not have completed the manoeuvre in the predetermined time.

BRIEF SUMMARY OF THE INVENTION

According to a first aspect, the invention provides a signal apparatus for a vehicle having at least one input at which signals are received from components associated with the vehicle, the received signals comprising an indication demand signal initiated by a driver of the vehicle and a lane detection signal produced by a lane detection apparatus indicative of the position of the vehicle relative to a lane of a highway, and a processing means which is arranged to produce an indication signal that is dependent upon both the indication demand signal and the lane detection signal.

The processor may be arranged to produce the indication signal following receipt of an indication demand signal and cancel the indication signal when the lane detection signal indicates that the vehicle is at an appropriate position relative to the lanes of the highway. The vehicle may be considered to be at an appropriate position relative to the lanes by determining the heading angle of the vehicle relative to the lane. Most preferably, it is considered appropriate to cancel when the vehicle is going straight ahead in the lane, i.e. by checking that the vehicle is at a heading angle of approximately zero degrees relative to the heading of the lane.

Checking the heading angle allows a vehicle to cross multiple lanes without the indicator auto-cancelling the cancellation only occurring at the end of the manoeuvre when the vehicle is travelling straight along its lane.

The processing means may cancel the indication signal by cancelling the indication demand signal, i.e. returning it to it original state prior to the driver initiated demand. Alternatively, a cancel signal may be produced which is combined with the indication demand signal to produce the indication signal. The combination may be by way of a logical operation, perhaps by passing both through an AND gate.

The processing means may be adapted to produce an indication demand signal after a driver initiated demand which continues even after a driver has indicated that the indication signal should be cancelled. This would prevent a driver cancelling a signal before a lane change has been completed.

The processing means may learn over time whether or not the indication should be cancelled after the driver has demanded that it is cancelled. For example, where a driver persistently cancels the indication before a lane change is completed, the processing means may learn this driver behaviour. On all subsequent operations of the indicator a time delay may be applied which is equal to the average time delay between a driver cancelling the demand signal and the vehicle completing the manouevere as determined from the lane detection signal.

Producing an indication signal that is dependent on both the indicator demand signal and a lane change signal allows the indicator to be cancelled when a manoeuvre has been completed. In this way, the driver no longer needs to remember to cancel the indicators. It also permits an indication to be cancelled at the correct time even if the vehicle changes lanes within a bend.

The processing means may comprise an electronic circuit such as an ASIC. It may, alternatively, be distributed across a multiple of electronic circuits, possibly connected across a bus or wiring loom of a vehicle. The processing means may therefore be distributed around the vehicle.

According to a second aspect, the invention provides a signal apparatus which includes: a turn signal indicator, which illuminates in response to an indication signal; an indicator switch, which is operable by a user to produce an indication demand signal; a lane detection apparatus, which produces a lane detection signal indicative of the position of a vehicle relative to the lanes of a multi-lane highway; and a processor, which references the indication demand signal with the lane detection signal to generate an indication signal.

The indication signal produced by the processor may activate the turn signal following receipt of an indication demand signal and cancel the indicator when the vehicle is at an appropriate position relative to the lanes of the highway as indicated by the lane detection signal.

The lane detection apparatus may include a camera, which is located on the vehicle such that a portion of the highway in front of the vehicle is included within its field of view. An example of such an apparatus is known from our earlier International Patent Application number PCT/GB02/02324, published under publication number WO02/092375, the disclosures of which are incorporated by reference herein.

The indicator switch may comprise a stalk, which is located close to the steering wheel of a vehicle for operation by a driver as is known in the prior art. It may produce an indication demand signal which changes state when the driver moves the stalk. The stalk may include a latch, which holds the output of the switch in either a rest state or a demand state when operated by the driver.

The processor may be arranged to cancel the indication signal regardless of whether the indicator is in the rest or the demand positions.

The indication signal may in a simple arrangement comprise a flag, which is raised by the processor when an indication is needed and lowered when it is not needed.

According to a third aspect the invention provides a method of operating an indicator of a vehicle during a lane change manoeuvre comprising initiating the indicator when an indication demand signal is received from an indicator switch and cancelling the indicator when a signal from a lane detection apparatus indicates that the vehicle has reached an appropriate position relative to the lanes of the highway.

The method may also cancel the indicator when a cancel signal is received without waiting for the lane signalling apparatus to indicate that the appropriate position has been reached. Such a signal may be received if a driver of the vehicle operates the indicator switch to cancel the indicator.

Other advantages of this invention will become apparent to those skilled in the art from the following detailed description of the preferred embodiments, when read in light of the accompanying drawings.

DETAILED DESCRIPTION OF THE INVENTION

The vehicle 1 shown in the accompanying drawings is fitted with a set of indicators, of which only the front left indicator 116 is shown. These are mounted in the usual fashion at each corner of the vehicle and are arranged to be illuminated in sets, with each set comprising the indicators on the left or right hand side of the vehicle 1.

Figure 1:
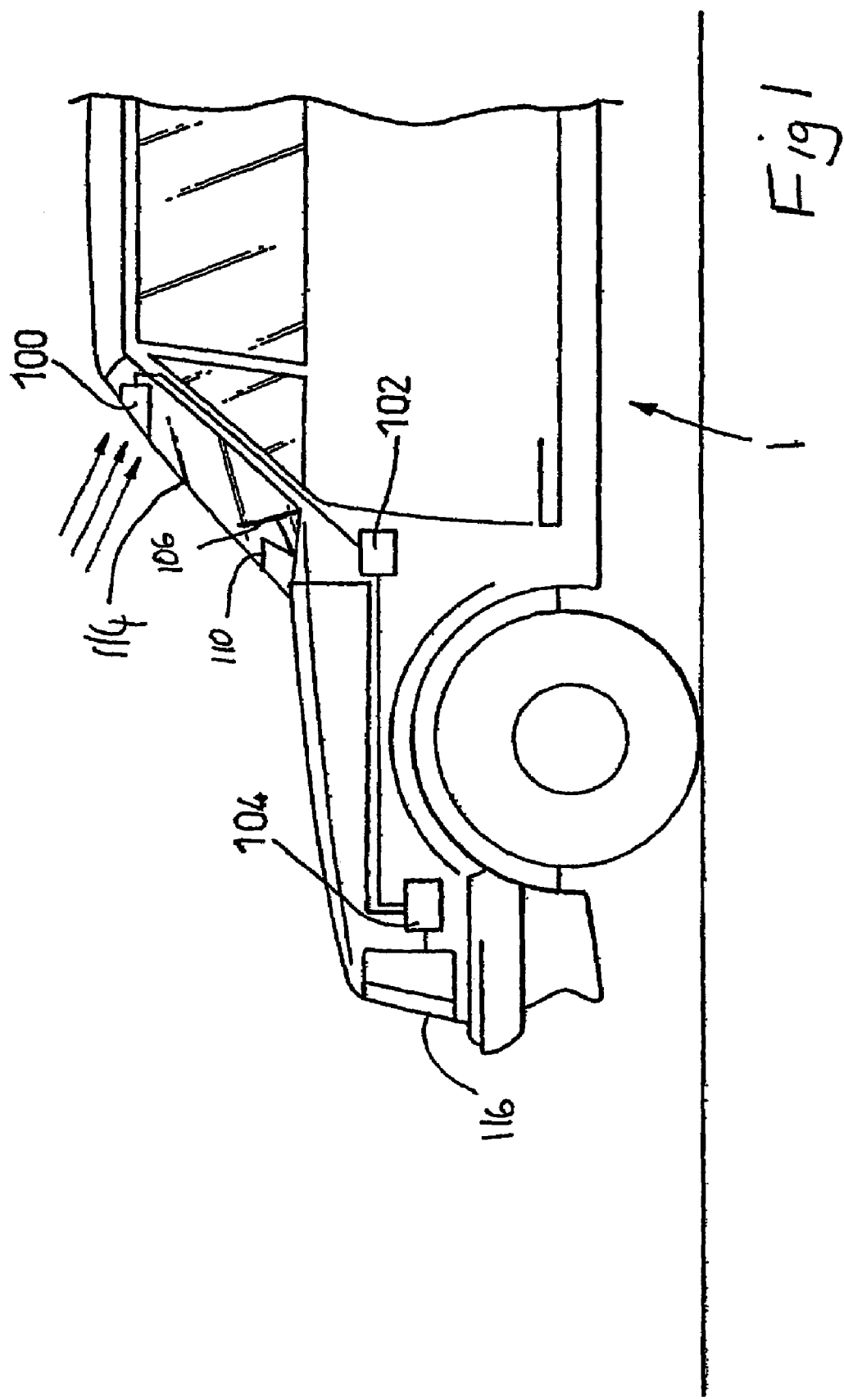
FIG. 1 shows a side view of a vehicle fitted with a signal apparatus according to the present invention.
Figure 2:
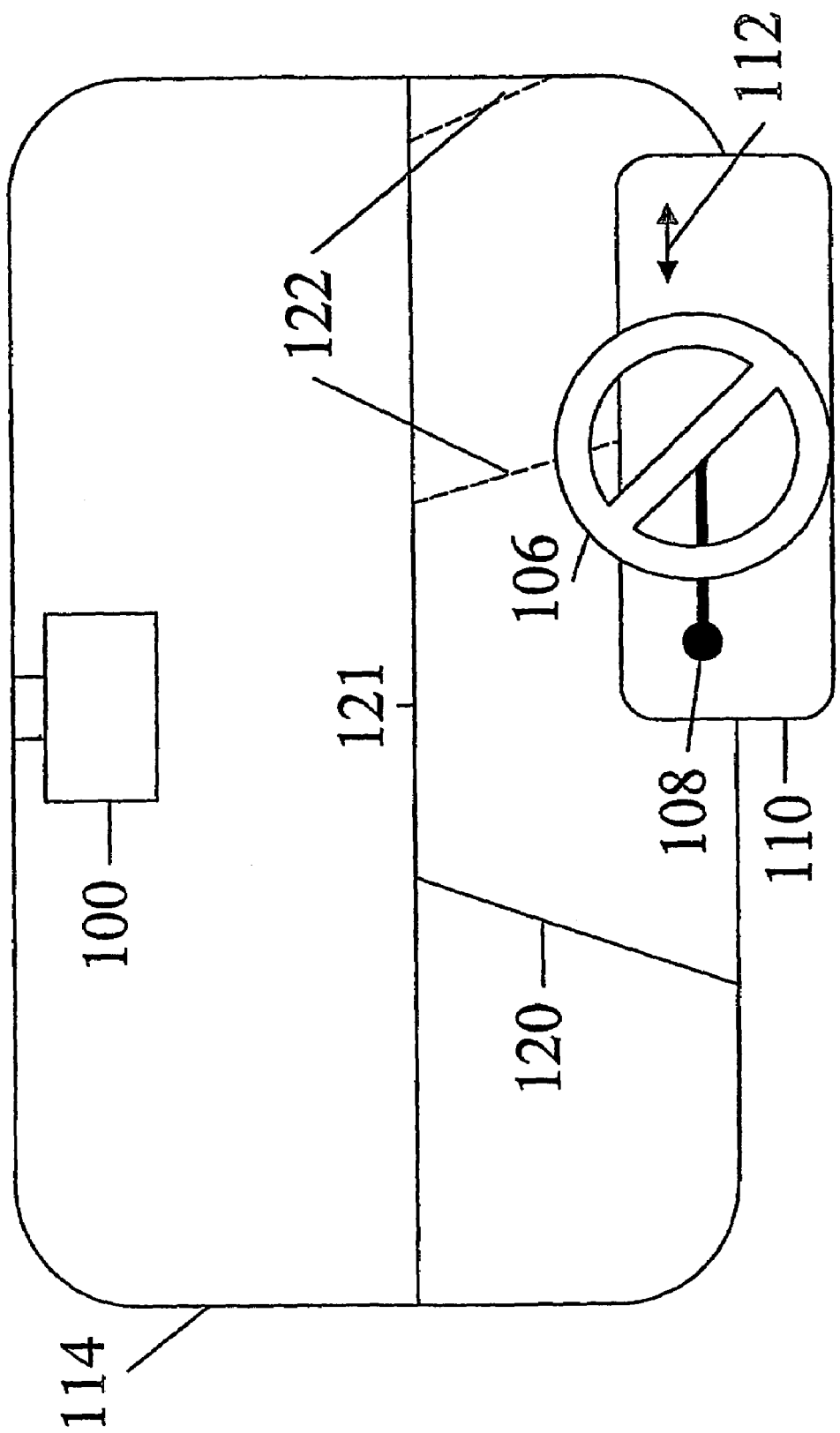
FIG. 2 shows a view from the interior of the vehicle of FIG. 1, forwards through the front window showing the road ahead.

In order to control the indicators 116, an indicator stalk 108 is provided in the region of steering wheel 106. This is of the common design where the driver of vehicle 1 signals a demand for illumination of the indicators 116 of one set or the other by pushing the indicator stalk 108 up or down for (in the example shown in FIG. 2 of the accompanying drawings where the indicator stalk 108 is mounted on the left hand side of the steering wheel 106) left or right sets respectively. The indicator stalk 108 latches in position once pushed and can be reset by the driver overriding the force of the latch or by the latch being released. In an alternative embodiment, the demand for indication is stored electronically by raising or lowering one or more flags and in which case a latch is not needed and a simple tap-up tap-down switch may be used.

An icon 112 is provided on dashboard 110 in view of the driver, which lights to indicate illumination of the indicators 116 and hence remind the driver that they are indicating. Indicator control means 104 detects the indictor demand and flashes the relevant set of indicators in the usual manner.

The vehicle is also fitted with a video camera 100 mounted behind front window 114, which captures images of the view of the road ahead of the vehicle 1. This is coupled to a lane detection apparatus 102, which analyses the captured images to detect lane boundaries such as those at the edge 120 of the road 121 or those separating lanes 122. The lane detection apparatus 102 fits the lane markings to a curve and uses this to calculate the heading angle and offset of the vehicle 1 relative to the lane boundaries 120, 122.

Although the indicator control means 104 and lane detection apparatus 102 are depicted as separate entities, the skilled man will envisage that these could be combined into one module, or one or more of the control means 104 and lane detection apparatus 102 could be combined into modules controlling other vehicle functions.

Figure 3:
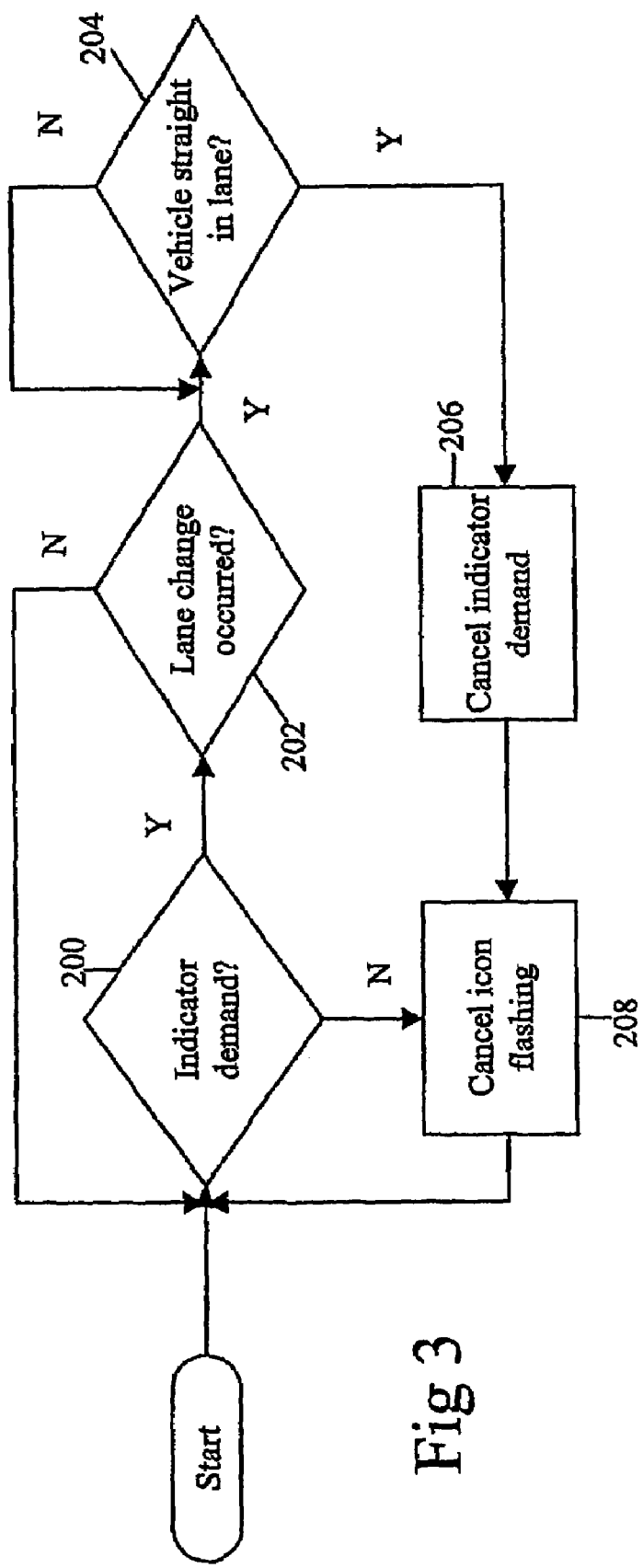
FIG. 3 shows a flowchart depicting the method carried out in the signal apparatus of FIGS. 1 and 2.

The indicator control means 104 also acts to cancel the flashing of the indicators 116 once a lane change has been completed. It does this by releasing the latch of the indicator stalk 108, hence cancelling the driver's demand for indication. The method that the control means 104 uses to determine whether to cancel the driver's demand is shown in FIG. 3 of the accompanying drawings.

In a first step 200, the control means checks whether the driver has demanded indication by use of the indicator stalk 108. If not, then the control means need take no further action other than to ensure the icon 112 has been extinguished 208. The method then repeats back to the first step 200.

If the driver has demanded indication, the control means 104 checks 202 whether the vehicle 1 has moved to the centre of the next lane. It does this by checking the offsets from lane boundaries measured by lane detection apparatus 102. The vehicle 1 is determined to have changed lane once it is roughly (typically within percent) in equidistant from the lane boundaries of the next lane in the indicated direction. Until this happens, the method is restarted from first step 200 to check whether the driver is still demanding an indication.

Once the control means 104 has determined that the vehicle 1 is in the correct lane, it checks 204 whether the vehicle 1 is straight in the lane. It does this by checking that the vehicle 1 is at a heading angle of approximately zero (typically within a range of 5° from zero) with respect to the lane boundaries of the new lane. This check is repeated until the vehicle 1 is straight in the lane.

Once the vehicle 1 is straight, the indication may be cancelled 206. The latch is released, although in an alternative embodiment the indicator stalk 108 may be driven into the cancelled position by a solenoid or other actuator or, in the case where the demand is stored electronically, the demand flag may be cleared. The indicator icon 112 is extinguished 208 and the method returns to the first step 200 where the control means 104 waits for the driver to indicate a demand.

In a further alternative, the control means 104 records if the driver cancels the demand before the method described above would have done. If the driver consistently does this, the control means may adjust when the method cancels the demand 206 by expanding the ranges of the lane offsets and heading angles in which the vehicle 1 is determined to be straight ahead in the appropriate lane. This is subject to a maximum limit from central in the lane and within a predetermined degrees of straight-ahead.

In accordance with the provisions of the parent statutes, the principle and mode of operation of this invention have been explained and illustrated in its preferred embodiment. However, it must be understood that this inventiono may be practiced otherwise than as specifically explained and illustrated without departing from its spirit or scope.

The invention claimed is:

1. A signal apparatus comprising:
   a turn signal indicator, which illuminates in response to a first indication signal;
   an indicator switch, which is operable by a user to produce an indication demand signal;
   a lane detection apparatus which produces a lane detection signal indicative of the position of a vehicle relative to the lanes of a multi-lane highway; and
   a processor, which receives and processes the indication demand signal and the lane detection signal to generate a second indication signal.

2. The apparatus of claim 1 wherein the indication signal produced by the processor activates the turn signal following receipt of the indication demand signal and cancels the indicator when the vehicle is at an appropriate position relative to the lanes of the highway as indicated by the lane detection signal.

3. The apparatus of claim 2 wherein the vehicle is at an appropriate position when the vehicle heading angle is substantially the same as the heading of the lane.

4. The apparatus of claim 1 wherein the lane detection apparatus includes a camera, which is located on the vehicle such that a portion of the highway in front of the vehicle is included within its field of view.

5. A method of operating a vehicle indicator during a lane change manoeuvre comprising:
  (a) initiating the indicator when an indication demand signal is received from an indicator switch; and
  (b) cancelling the indicator when a signal from a lane detection apparatus indicates that the vehicle has reached an appropriate position relative to the lanes of the highway.

6. The method of claim 5 which further comprises cancelling the indicator when a cancel signal is received without waiting for the lane signaling apparatus to indicate that the appropriate position has been reached.

7. A signal apparatus for a vehicle comprising:
  a lane detection apparatus; and
  a processor;
  wherein the processor includes at least one input at which signals are received from components associated with the vehicle;
  wherein the received signals include an indication demand signal initiated by a driver of the vehicle, and a lane detection signal produced by the lane detection apparatus, the lane detection signal indicative of the position of the vehicle relative to a lane of a highway; and
  wherein the processor is arranged to produce an indication signal that is dependent upon both the driver initiated indication demand signal and the lane detection signal produced by the lane detection apparatus.

8. The apparatus of claim 7 wherein the lane detection apparatus detects the position of lane boundaries along a road and the lane detection signal indicates the position of the vehicle relative to the lane boundaries.

9. The apparatus of claim 7 wherein the lane detection signal is indicative of the heading angle of the vehicle relative to a lane of a highway.

10. The apparatus of claim 7 wherein after the vehicle has changed lanes on the highway, the lane detection signal indicates when the vehicle is heading straight along a lane as determined by the position of the vehicle relative to the detected position of the lane boundaries.

11. The apparatus of claim 1 wherein the lane detection apparatus detects the position of lane boundaries along a multi-lane highway and the lane detection signal indicates the position of the vehicle relative to the lane boundaries.

12. The method of claim 5 further including prior to step (b), the step of detecting with a lane detection apparatus the position of lane boundaries along a highway, wherein the lane detection apparatus produces a lane detection signal which indicates the position of the vehicle relative to the lane boundaries.

13. The apparatus of claim 7 wherein the processor is arranged to produce the indication signal following receipt of the indication demand signal and cancel the indication signal when the lane detection signal indicates that the vehicle is at an appropriate position relative to the lanes of the highway.

14. The apparatus of claim 13 wherein the vehicle is considered to be in the appropriate position when the vehicle is heading straight along a lane.

15. The apparatus of claim 7 wherein the processor is adapted to produce an indication demand signal after a driver initiated demand which continues even after a driver has indicated that the indication signal should be cancelled.

16. The apparatus of claim 15 wherein the processor learns over time whether or not the indication should be cancelled after the driver has demanded that it is cancelled.

* * * * *